Jan. 31, 1928.
C. G. COOPER ET AL
1,657,819
PNEUMATIC GREASE GUN
Filed June 15, 1925      2 Sheets-Sheet 1
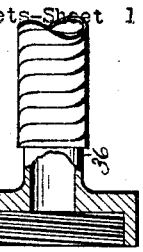
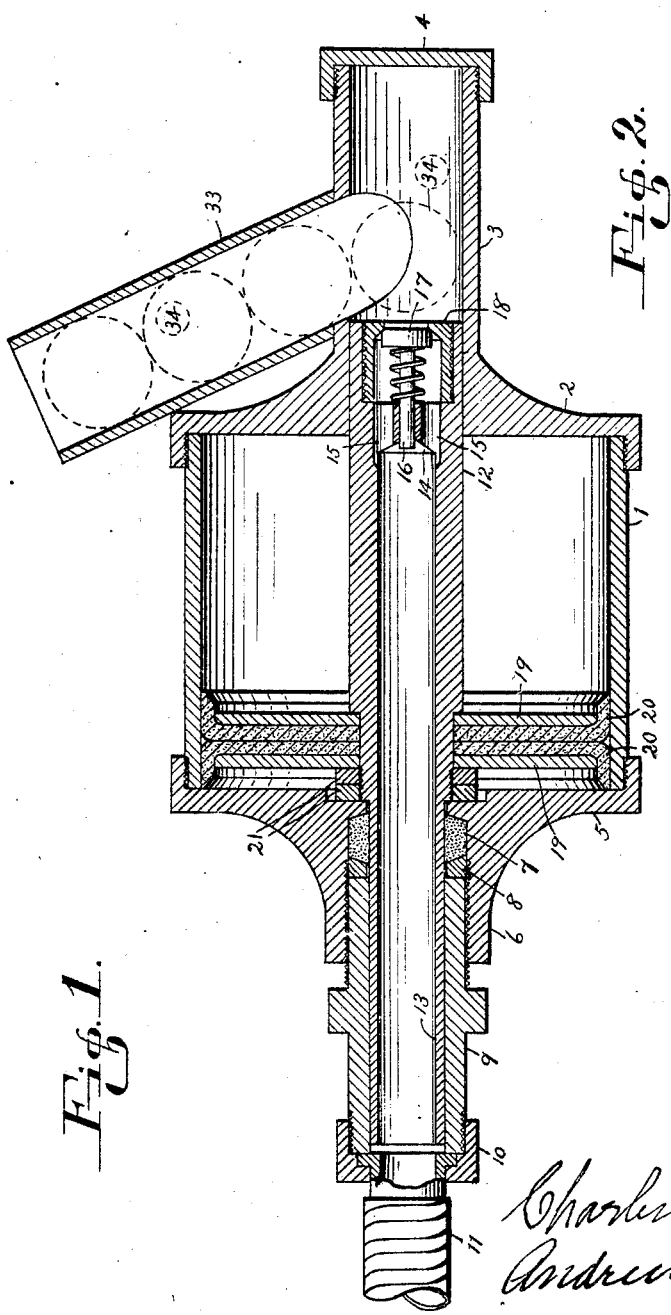
INVENTORS.
Charles G. Cooper
Andrew J. Dinkel

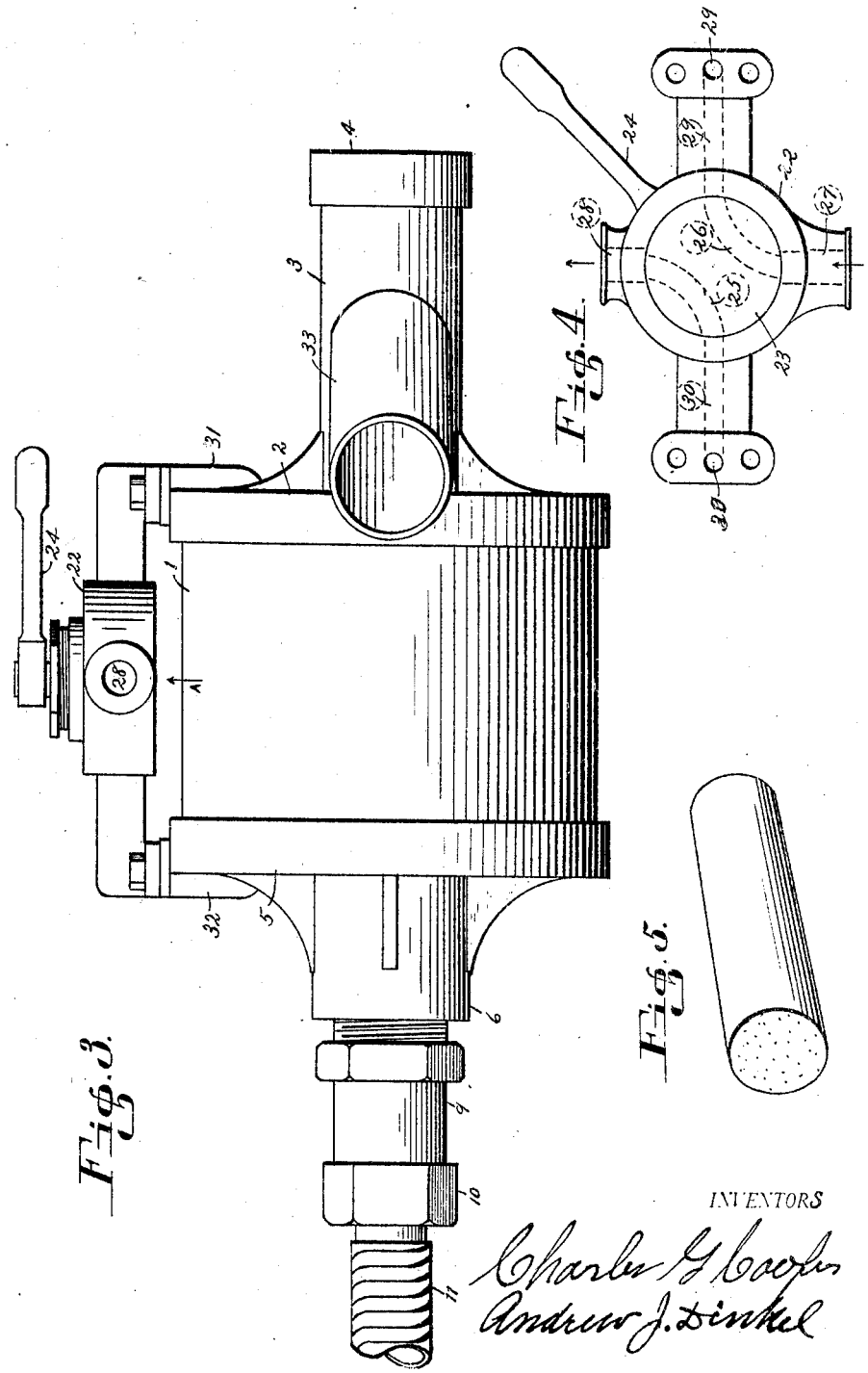

Patented Jan. 31, 1928.

1,657,819

UNITED STATES PATENT OFFICE.

CHARLES G. COOPER AND ANDREW J. DINKEL, OF YUMA, ARIZONA.

PNEUMATIC GREASE GUN.

Application filed June 15, 1925. Serial No. 37,191.

Our invention relates to devices for forcing lubricating grease into bearings of engines and other machinery, the objects being, first, to provide a grease gun which is operated by fluid pressures, second, to provide in such a device means for developing, from a moderate fluid pressure, a very high pressure upon the grease, third, to provide a grease gun, operated by fluid pressure, with means for using the pressure exerted against the grease in its simple power and also, when greater pressure is required, to compound the power exerted upon the grease. The present invention is more particularly adapted to inject very hard grease into the bearings of locomotives, and a fourth object is to provide a grease gun which can be operated by air from the air compressor of the locomotive to force grease into its bearings.

With reference to the accompanying drawings:

Fig. 1 is a longitudinally sectioned elevation of the entire device.

Fig. 2 is a group figure showing certain parts required to transform the invention from a simple to a compound gun.

Fig. 3 is a top view of the entire device.

Fig. 4 is a view in side elevation of a valve element for controlling the operation of the device, the view being taken in the direction of the arrow A Fig. 3.

Fig. 5 is a perspective view of a stick of grease such as is fed to the gun.

More specifically the present invention comprises an actuating cylinder 1 provided with a head 2, in an extension of which is formed a low pressure plunger cylinder 3, having a cap 4, and a head 5 in which is formed a packing gland 6 having packing 7 and a follower 8. An element 9 is screwed into the packing gland 6 against the follower 8 and forms a high pressure plunger cylinder on the outer end of which a union 10 and discharge tube 11 is screw seated. The discharge tube 11 is here shown as a flexible metallic tube but it may be formed of solid metal tubing with swing joints and in either case it is provided at its outer end with adequate means for connecting it to the fixture mounted upon the bearing to which grease is applied.

A plunger element is provided for the cylinders having a low pressure end 12 slidably mounted in the low pressure cylinder 3 and a high pressure end 13 slidably mounted in the high pressure cylinder 9. The plunger element is developed in its interior by boring in from the high pressure end to a point near the low pressure end, then boring in from the low pressure end with a drill of larger diameter sufficiently deep to leave a solid section 14. The section 14 is then provided with several small holes 15 to allow for the passage of grease and a central bore in which is slidably mounted the valve stem 16 of a valve 17. A plug 18 is screw seated in the bore of the low pressure end having a central orifice against which the valve 17 forms a closure as shown.

At the center between the high and low pressure ends of the plunger element a piston for the actuating cylinder is mounted comprising a couplet of plates 19, 19 between which a pair of oppositely faced cup leathers 20, 20 are carried, the plates and cup leathers being held firmly in position by the two nuts 21.

A valve for operating the cylinder 1 may be constructed like that shown in Fig. 4 in which 22 represents a body member and 23 a rotatably mounted plug having a handle 24. The plug 23 carries a curved port 25 and a second curved port 26 and the body member carries an inlet port 27, a discharge port 28, a port 29 for the right hand end of the cylinder and a port 30 for the left hand end of the cylinder. When the valve is mounted on the cylinder 1 as shown in Fig. 3 the ports 29 and 30 match with holes bored in the members 31 and 32 respectively, whereby air may flow into and out of each end of the cylinder 1. In the operation of the valve with the handle in the position shown in Fig. 4 air is admitted to the right hand end of the cylinder through inlet port 27 port 26 and port 29 and at the same time air may flow out of the left hand end of the cylinder through ports 30, 25 and 28. With the handle thrown to the left port 27 connects with ports 26 and 28. Thus air is admitted to the left hand end of the cylinder and discharged from the right hand end.

A tubular feed hopper 33 is mounted upon the low pressure plunger cylinder 3 and in open communication with its interior, the hopper being adapted to receive balls of grease 34 as shown in Fig. 1 or a stick of grease as shown in Fig. 5.

In the operation of the present invention the hopper 33 is loaded with hard grease, the tube 11 is connected with the fitting of the bearing to be greased and air is admitted, by hose connection with a source of pressure supply, to the inlet 27. The handle 24 is then moved to the left causing the piston to move to the right thus compressing a ball of grease represented by the bottom dotted circle 34. This grease is forced back through the valve 17 and the bores in the plungers 12 and 13. When the piston has made a full stroke to the right the handle 24 is thrown to the right and the piston and plungers move to the left allowing another ball of grease to fall into the low pressure plunger cylinder the handle 24 is again thrown to the left compressing the second ball of grease and so on until the grease has filled into the high pressure plunger cylinder. When the grease has filled into the high pressure cylinder the piston of the actuating cylinder on moving to the left now compresses the grease a second time through the plunger 13 thus forcing it out through the tube 11. The operation of the device may be discontinued by moving the handle 24 to a vertical position.

More pressure is usually required to force the grease out through the tube 11 and into a bearing than to force the grease from the low pressure cylinder into the high pressure cylinder; therefore the low pressure plunger should have more than twice the area of the high pressure plunger. The diameters of the plungers and the length of the stroke are so proportioned that the volume of grease compressed through the last part of the stroke of the low pressure plunger will be about sufficient to completely fill the high pressure cylinder throughout the length of the stroke. It is admitted that a vacuum is created in both plunger cylinders through a part of the backward stroke but the power of the actuating cylinder is sufficient to overcome such a vacuum on the small areas and also compress the grease. It is intended that a check valve shall be mounted on the fitting of each bearing thus preventing the grease from being drawn back into the high pressure cylinder through the tube 11 and the valve 17 performs the same office for the low pressure cylinder.

When climatic conditions are favorable as to temperature or when the grease used is sufficiently soft the gun herein shown may be used in a simple form instead of compound form as hereinbefore described. To change the gun into a simple acting device the cap 4 is removed, the plug 18 is screwed out and a solid plug 34 (see Fig. 2) is screwed into its place. A cap 35 having discharge conduit 36 is screwed on in place of the cap 4. With these changes the gun will operate only on the low pressure end to discharge grease out through the conduit 36, the plunger 13 in such an arrangement only acting as a sliding guide.

While air has been mentioned herein as the actuating fluid it is to be understood that the device will operate equally as well with other fluids under pressure.

The exact form of the means for charging grease into the gun and of the valve for operating the actuating cylinder forms no part of our present invention, and it is to be understood that many changes might be made in the invention as shown without departing from the spirit thereof as claimed.

Having thus described our invention, we claim:

1. A grease gun comprising a high pressure cylinder and a low pressure cylinder, a plunger reciprocable in both of the cylinders, a passage in the plunger to establish communication between the cylinders, means for supplying grease to the low pressure cylinder, means for reciprocating the plunger to temporarily cut off the grease supply means and place the grease under pressure when the plunger is moved in one direction and thus force the grease through the passage to the high pressure cylinder, and means operable when the plunger is moved in the opposite direction to check the grease in the passage against being returned to the low pressure cylinder so as to cause the grease to accumulate in the passage and thus co-act with the high pressure end of the plunger in forming a piston for ejecting grease from the high pressure cylinder under a pressure greatly exceeding the pressure in the low pressure cylinder.

2. A grease gun as embodied in claim 1, wherein the grease supply means includes a port in communication with the low pressure cylinder during a part of the stroke of the plunger in the first mentioned direction, so as to admit a charge of grease to the cylinder, and during the remainder of the stroke to be closed by the plunger so that the charge is placed under pressure by the plunger.

3. A grease gun as embodied in claim 1, wherein the grease checking means comprises a valve at the low pressure end of the plunger which is yieldably urged to closed position.

4. A grease gun as embodied in claim 1, wherein the grease checking means comprises a valve in the plunger which is yieldably urged to closed position, and the grease supply means includes a port in communication with the low pressure cylinder during a part of the stroke of the plunger in the first mentioned direction so as to admit a charge of grease to the cylinder and during the remainder of the stroke to be closed so that the charge is placed under pressure by the plunger.

5. A grease gun as embodied in claim 1, wherein the grease checking means comprises a valve in the plunger which is yieldably urged to closed position, and the grease supply means includes a port in communication with the low pressure cylinder during a part of the stroke of the plunger in the first mentioned direction so as to admit a charge of grease to the cylinder and during the remainder of the stroke to be closed by the plunger so that the charge is placed under pressure by the plunger, and a removable cap for the low pressure cylinder.

In testimony whereof we have signed our names to this specification.

CHARLES G. COOPER.
ANDREW J. DINKEL.